US007602168B2

(12) United States Patent
Wang et al.

(10) Patent No.: US 7,602,168 B2
(45) Date of Patent: Oct. 13, 2009

(54) VOLTAGE REGULATOR FOR INTEGRATED CIRCUITS

(75) Inventors: Yanzhuo Wang, Austin, TX (US); Jon S. Choy, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 215 days.

(21) Appl. No.: 11/849,155

(22) Filed: Aug. 31, 2007

(65) Prior Publication Data

US 2009/0059629 A1    Mar. 5, 2009

(51) Int. Cl.
  *G05F 1/40*    (2006.01)
  *G05F 1/56*    (2006.01)
(52) U.S. Cl. ...................... 323/288; 323/282
(58) Field of Classification Search ............ 323/268, 323/271, 282, 288, 350, 351; 363/59, 60; 327/535, 536, 538
  See application file for complete search history.

(56) References Cited

U.S. PATENT DOCUMENTS 5,812,017 A * 9/1998 Golla et al. ............. 327/536
5,946,258 A * 8/1999 Evertt et al. ............ 365/226
6,456,153 B2 * 9/2002 Buck et al. ............. 327/536
6,515,903 B1 * 2/2003 Le et al. ............. 365/185.18
6,628,151 B1 * 9/2003 Zhou et al. ............. 327/134
7,279,959 B1 * 10/2007 Choy ..................... 327/536

* cited by examiner

*Primary Examiner*—Matthew V Nguyen
(74) *Attorney, Agent, or Firm*—Jackson Walker L.L.P.

(57) ABSTRACT

A voltage regulator for a charge pump includes a capacitor divider and a reset circuit. The capacitor divider produces, based on an input voltage (VPP), a sample voltage at a sampling node. The sampling node and a reference voltage VREF are connected to respective inputs of a comparator that generates an enable signal for the charge pump. The reset circuit connects to the divider and includes a first transistor connected between the sampling node and a biasing node. During a sampling mode, the reset circuit biases VDS of the first transistor to approximately zero at the regulation point to minimize sub-threshold IDS. During reset intervals, the reset circuit applies VREF to the biasing node. The reset circuit may include a second transistor connected between the biasing node and a known level (e.g., ground) and a biasing transistor connected between the biasing node and VREF.

22 Claims, 3 Drawing Sheets

VOLTAGE REGULATOR FOR INTEGRATED CIRCUITS

BACKGROUND

1. Field

The disclosed subject matter is in the field of voltage regulation for integrated circuit applications.

2. Related Art

A charge pump is an electronic circuit that receives an input voltage and uses a capacitor as an energy storage element to generate an output voltage that differs from the input voltage. Charge pumps employ switching to control the connection of voltages to the capacitor. Some examples of a charge pump, for instance, generate an output voltage that is greater than the input voltage by first charging the capacitor to the input voltage. The positive terminal of the input voltage is then disconnected from the positive terminal of the capacitor and reconnected to the negative terminal of the capacitor. Because the capacitor voltage cannot change instantaneously (ignoring leakage effects), the voltage of the capacitor positive terminal is effectively doubled.

Charge pumps are widely employed in flash memory products to provide a higher voltage needed to program and erase stored data. Commercially available flash memory products generally require only one external power supply, e.g., 1.8V or 3.3V. Program and erase operations generally require a higher voltage. Charge pumps are used to provide this higher voltage.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Regulation of the voltage produced by a charge pump is needed to ensure a stable pump voltage. In the absence of effective regulation, charge pump voltage might vary depending upon environmental factors, load factors, and the processing parameters under which the charge pump was fabricated.

In one aspect, a disclosed voltage regulator suitable for use in regulating the voltage produced by a charge pump includes a capacitor divider and a reset circuit. The reset circuit receives the output voltage (VPP) generated by the charge pump as its input voltage and produces a sample voltage (VSAMPLE) at a sampling node of the capacitor divider. The capacitor divider includes a first capacitor connected between ground and the sampling node and a second capacitor connected between the sampling node and an upper node. The sampling node voltage VSAMPLE and a reference voltage VREF provide inputs to a comparator that produces an enable signal (PUMP_EN) for the charge pump.

The reset circuit is connected to the sampling node. The reset circuit includes a first transistor connected between the sampling node and a biasing node, a second transistor connected between the biasing node and ground, a third transistor connected between the upper node and ground, and a fourth transistor connected between the biasing node and a reference voltage signal (VREF). The reset circuit include two operational modes, a reset mode and a sampling mode.

During the reset mode, the first, second, and third transistors are ON and the fourth transistor is OFF. During reset mode, the sampling node is isolated from VREF and the capacitors in the capacitor divider are discharged. During the sampling mode, the first, second, and third transistors are OFF and the fourth transistor is ON. During sampling mode, VREF is applied to the biasing node and the first transistor is in a high impedance state. The sampling node will charge up, through the capacitor divider to the sample voltage VSAMPLE, which is approximately equal to VREF once the charge pump reaches the targeted regulation level. In this configuration, the source/drain voltage (VDS) of the first transistor is approximately equal to zero. The very low VDS across the first transistor results in very low subthreshold leakage through the first transistor. To the extent that subthreshold leakage might otherwise cause undesired discharging of the capacitors in the capacitor divider and the consequent drifting of VSAMPLE, configuring the regulator to produce approximately zero volts across the transistor that is connected to the sampling node beneficially reduces subthreshold leakage-induced drifting of VSAMPLE.

Figure 1:
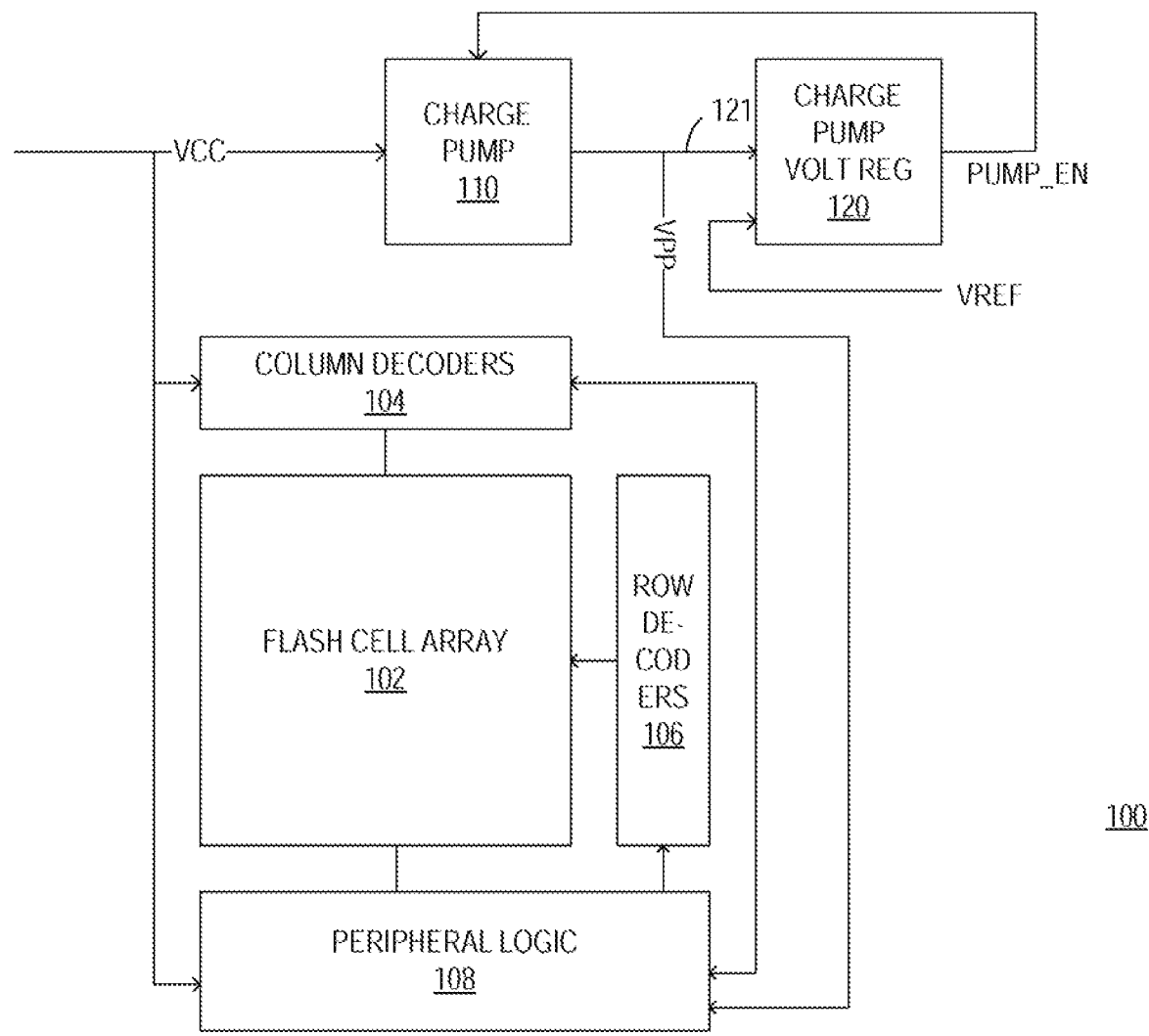
FIG. 1 is a block diagram of selected elements of an embodiment of a circuit having a charge pump and a charge pump voltage regulator.

Referring to FIG. 1, an embodiment of a circuit 100 employing a charge pump 110 and a charge pump voltage regulator (CPVR) 120 is depicted. Circuit 100 may, in some embodiments, be implemented as an integrated circuit fabricated, for example, on a monolithic semiconductor substrate. In the depicted embodiment, circuit 100 includes elements of a NOR or NAND flash memory device. A flash memory device is suitable for implementing the disclosed charge pump voltage regulator because flash memory devices generally include a charge pump to produce the higher voltages needed for program and erase operations. In other embodiments, however, circuit 100 may be any other type of circuit that includes a regulated charge pump.

As shown in FIG. 1, the depicted embodiment of circuit 100 includes a flash cell array 102, column decoders 104, row decoders 106, and peripheral logic 108. Flash cell array 102 may include conventional floating gate flash memory cells or other types of flash cells arranged in rows and columns. Column decoders 104 may be configured to receive a column address from peripheral logic 108 and to select one column in flash cell array 102, e.g., by selecting a word line. Similarly, row decoders 106 may be configured to receive a row address, from peripheral logic 108 and select one row in flash cell array 102, e.g., by selecting a bit line. During program and/or erase operations, higher voltage levels may be applied to bit lines and/or word lines in flash cell array 102. Other types of flash memory cells may have other configurations in other embodiments.

In the depicted embodiment of circuit 100, the higher voltages needed for program and erase are provided by charge pump 110. Integrated circuit 100 as shown is operable to connect to an externally provided source of power in the form of an externally provided DC supply voltage (VCC). VCC is provided to flash array 102, peripheral logic 108, and row and column decoders 106 and 104. VCC may be produced by a battery or by a rectifier circuit that receives a conventional AC signal as its input.

Charge pump 110 is configured to receive VCC as an input voltage and to produce at least one output voltage, identified in FIG. 1 as VPP, that is different than VCC. In flash memory devices employing circuit 100, for examples VPP may represent a voltage specified for programming and/or erasing one or more cells in flash array 102. In these embodiments, VPP is greater than VOC, but in other embodiments, VPP may be less than VOC in magnitude and may have a different polarity than VCC. In some embodiments, VCC may be 1.8 V or 3.3.V while VPP may be 5V or greater. Some embodiments of circuit 100 may include multiple charge pumps to produce multiple different voltages, multiple different copies of a particular voltage, or both.

In the depicted implementation, the VPP produced by charge pump 110 provides a first input 121 to CPVR 120. CPVR 120 as shown also receives a second input voltage identified as VREF. As suggested by its name, VREF is a reference voltage that is relatively stable across a range of operating and processing conditions. CPVR 120 generates a pump enable (PUMP_EN) signal that is provided to charge pump 110 as an input signal. Charge pump 110 is configured to turn on based, at least in part, on the logical state of PUMP_EN generated by CPVR 120. If VPP drops sufficiently below a desired value. CPVR 120 will detect the drop and assert PUMP_EN to activate charge pump 110 and thereby increase VPP. In this manner, VPP is dynamically regulated to remain within a specified range of a desired value.

Figure 3:
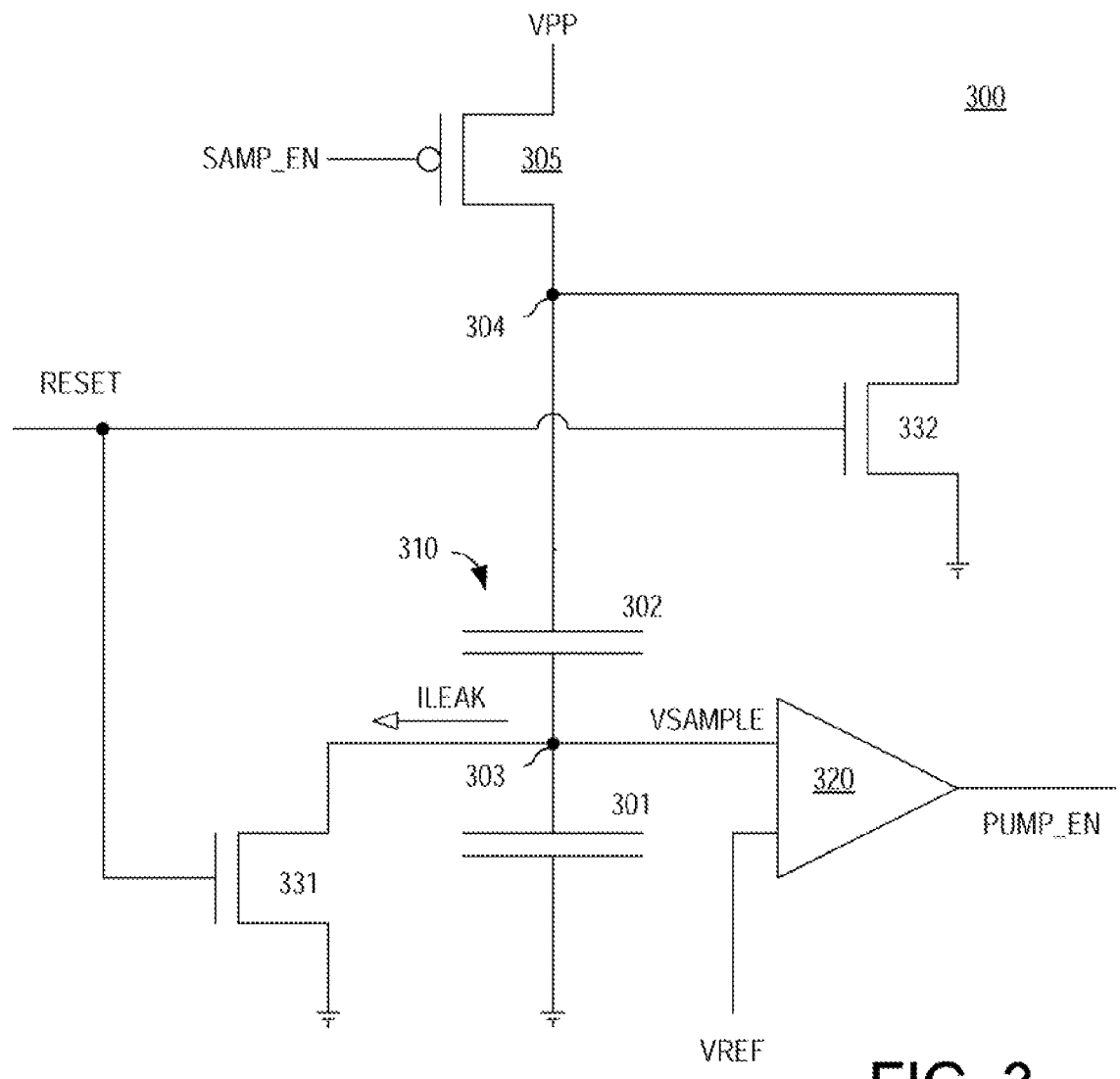
FIG. 3 illustrates selected elements of a conventional charge pump voltage regulator.

Referring to FIG. 3, a conventional voltage regulator 300 is shown. Regulator 300 produces a pump enable signal PUMP_EN that is fed back to charge pump 110. As shown in FIG. 3, regulator 300 includes a capacitor divider 310 that includes a first capacitor 301 and a second capacitor 302 arranged in series between a switch transistor 306 and ground. The voltage at sampling node 303, which is common to capacitors 301 and 302, is identified as VSAMPLE. The ratio of VSAMPLE to VPP is determined, in part, by the relative sizes of capacitors 301 and 302. A first reset transistor 331 is arranged between sampling node 303 and ground to provide a mechanism to discharge capacitor 301 and reset sampling node 303 from time to time by assertion of the RESET signal. Similarly, a second reset transistor 332 is arranged between an upper node 304 of capacitor divider 310 and ground. Second reset transistor 332 enables the RESET signal to discharge second capacitor 302 and thereby reset upper node 304. Switch transistor 305, connected between capacitor divider 310 and the voltage to be regulated (VPP), is controlled by a sample enable signal SAMP_EN. When SAMP_EN is HIGH, switch transistor 305 is cut off to isolate VPP from capacitor divider 310. The RESET signal and the SAMPLE signal may be asserted periodically based on an internal clocking mechanism (not depicted) or based on clocking derived from an external clock (not depicted).

PUMP_EN is asserted when VSAMPLE is less than VREF and PUMP_EN is de-asserted when VSAMPLE is greater than VREF. VSAMPLE is derived from the voltage produced by charge pump 110, i.e., VPP. Regulator 300 is designed so that, ideally, VSAMPLE is determined solely by the value of VPP and the relative sizes of the two capacitors. In the presence of charge leakage, however, VSAMPLE drifts from its ideal value and is a less accurate indicator of VPP. The resulting inaccuracy can cause the charge pump to turn off or on when it is undesirable. It will be appreciated by those of ordinary skill in the art, therefore, that precise control of VPP is difficult if VSAMPLE does not accurately reflect the current value of VPP. VSAMPLE variation attributable to charge leakage is referred to herein as sample drift.

Sample drift can occur in regulator 300 due to undesired current flowing through first reset transistor 331. Even when the gate terminal of first reset transistor 331 is grounded, for example, a subthreshold current, referred to herein as the leakage current ILEAK, flows between the drain and source terminals of first reset transistor 331. ILEAK may discharge first and/or second capacitors 301 and 302 and cause VSAMPLE to drift. ILEAK may be sufficient, especially at elevated temperatures, to produce a relatively rapid rate of drift. To address this problem, regulator 300 must account for VSAMPLE drift relatively frequently. For example, regulator 300 might have to assert RESET frequently to eliminate inaccuracy caused by sample drift.

Figure 2:
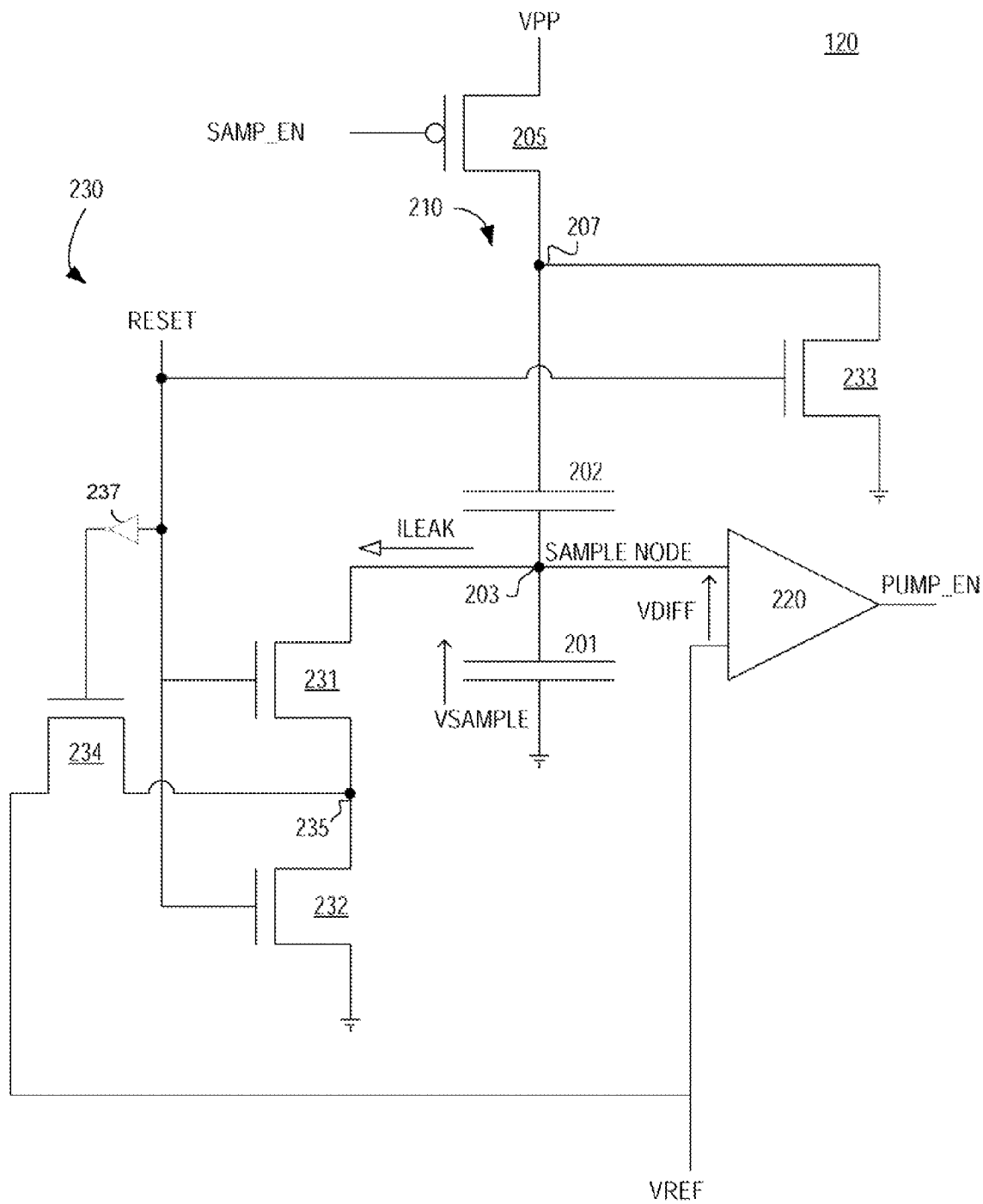
FIG. 2 illustrates selected elements of an embodiment of the charge pump voltage regulator of FIG. 1.

Referring now to FIG. 2, selected elements of an embodiment of the CPVR 120 of FIG. 1 are shown. The depicted embodiment employs metal oxide semiconductor (MOS) transistors in which a gate terminal serves as a control terminal and source/drain terminals server as the current conductor terminals or, more simply, the current terminals. Other implementations may substitute bipolar transistors for one or more of the MOS transistors depicted in FIG. 2. In the case of bipolar transistors, the base terminal represents the control terminal while the collector and emitter terminals are the current terminals. Moreover, whereas FIG. 2 depicts an implementation in which the MOS transistors are predominantly n-channel MOS (NMOS) transistors, other embodiments may employ PMOS transistors. Similarly, to the extent that bipolar transistors are used, the transistors may include npn transistors, pnp transistors, or both.

CPVR 120 as depicted includes a capacitor divider 210 and a low leakage reset circuit 230. CPVR 120 produces the PUMP_EN signal that enables the operation of charge pump 110. The PUMP_EN signal produced by CPVR 120 is indicative of the difference between VREF and a sampling voltage, VSAMPLE. Capacitor divider 210 derives the sampling voltage VSAMPLE from the voltage to be regulated which, in this case, is the supply voltage VPP generated by charge pump 110. In the depicted embodiment, capacitor divider 210 is designed so that VSAMPLE equals VREF when VPP is equal to a desired value assuming no drift of VSAMPLE has occurred. In this idealized, no-drift state, the differential voltage VDIFF contains no component attributable to sample drift and is, therefore, indicative solely of VPP and, more specifically, the variation of VPP from its desired value.

As shown in FIG. 2, capacitor divider 210 of CPVR 120 includes a first capacitor 201 and a second capacitor 202 arranged in series between ground and an upper node 207 of capacitor divider 210. First capacitor 201 is connected between ground and the sampling node 203 such that the voltage across first capacitor 201 is the sampling voltage VSAMPLE. Second capacitor 202 as shown is connected between sampling node 203 and upper node 207. In some embodiments, first and second capacitors 201 and 202 are fabricated on the same semiconductor substrate as comparator 220. Alternative embodiments may, however, employ discrete or external capacitors for capacitors 201 and 202.

Assuming an initial condition in which first capacitor 201 and second capacitor 202 are fully discharged, the steady state sampling voltage VSAMPLE after capacitor divider 210 is connected to VPP is determined by the capacitor ratio, i.e., the ratio of the capacitance of first capacitor 201 to the capacitance of second capacitor 202. Specifically:

$$VSAMPLE = (C2/CTOT) * VPP \qquad [EQ. 1]$$

where C2 is the capacitance of second capacitor 202, CTOT=C1+C2, and C1 is the capacitance of first capacitor 201. Thus, capacitor divider generates VSAMPLE as a divided down voltage of the voltage to be regulated, namely, VPP. The parameters C1, C2, and possibly VREF may be adjusted so that:

$$VREF = (C2/CTOT) * VPP \qquad [EQ. 2]$$

In this design, assuming no drift, VSAMPLE=VREF when VPP is equal to its specified value.

VSAMPLE and VREF provide inputs to a comparator 220. Comparator 220 senses the differential voltage VDIFF to produce pump enable signal PUMP_EN.

Reset circuit 230 as shown is designed to reduce sample drift by reducing charge leakage from sampling node 203. Reset circuit 230 beneficially improves operational accuracy of capacitor divider 210 by providing a mechanism to discharge capacitors 201 and 202 and thereby reset divider 210 and the nodes 203 and 207 of divider 210. CPVR 120 employs three transistors, referred to herein as reset transistors 231, 232, and 233 to controllably reset the capacitor divider. While a reset circuit is desirable for its ability to discharge the capacitor divider, reset transistors 231 and 232 undesirably provide a current path for charge leakage from sampling node 203.

In the depicted embodiment, the primary source of leakage from sampling node 203 wilt be leakage current (ILEAK) through the source/drain terminals of first reset transistor 231, especially at elevated temperatures. Reset circuit 230 reduces leakage current by reducing the voltage drop (VDS) across the source/drain terminals of first reset transistor 231 when CPVR 120 is sampling. By reducing the VDS of first reset transistor 231, subthreshold current through the transistor is greatly reduced thereby greatly reducing undesired drift of the sampling voltage VSAMPLE.

As shown in FIG. 2, reset circuit 230 includes the three NMOS reset transistors 231 through 233 referred to above, a fourth NMOS transistor 234, and an inverter 237. The source/drain terminals of first and second reset transistors 231 and 232 are connected in series between ground and upper node 207. A third reset transistor 233 is connected between ground and upper node 207. A reset signal (RESET) drives the gate electrodes of all three reset transistors 231, 232, and 233. Inverter 237 generates the logical inverse of the RESET signal that is applied to the gate of transistor 234 referred to herein as biasing transistor 234. The source/drain terminals of biasing transistor 234 are connected between VREF and a node, referred to herein as biasing node 235. Biasing node 235, as shown, is also a node that is common to a source/drain terminal of first and second reset transistors 231 and 232.

Upper node 207 is connected to a source/drain terminal of a switch transistor 206. Switch transistor 205 as shown is a PMOS depletion mode device with its source/drain terminals connected between an upper node 207 of capacitor divider 210 and the voltage to be regulated, VPP. Switch transistor 206 is controlled by a signal identified as SAMP_EN. In some embodiments, the SAMP_EN signal is derived from the RESET signal, SAMP_EN may be, for example, in phase with, but of a different magnitude than the RESET signal. In other embodiments, SAMP_EN and RESET may have a common magnitude.

Reset circuit 230 as depicted addresses subthreshold leakage by biasing the biasing node 235 to a voltage that is approximately equal to the expected value of sampling node 203, thereby producing a configuration in which the source/drain voltage VDS of first reset transistor 231 is approximately zero. By producing a VDS of approximately zero, reset circuit 230 reduces subthreshold leakage through first transistor 231, which in turn reduces sample drift, i.e., reduces variation in VSAMPLE attributable to subthreshold leakage of transistor 231.

Reset circuit 230 as shown includes two modes of operation, namely, reset mode and sampling mode. During reset mode, RESET and SAMP_EN are asserted HIGH to isolate VPP from capacitor divider 210 and to turn on reset transistors 231, 232, and 233 to discharge first and second capacitors 201 and 202 to ground, thereby resetting VSAMPLE and the voltage at upper node 207. In some embodiments, the SAMP_EN signal may have a different magnitude than the RESET signal. During reset mode, the logical inverse of RESET, as produced by inverter 237, is applied to biasing transistor 234 to cut it off and thereby isolate biasing node 235 from the reference voltage VREF. In some embodiments, additional logic (not depicted) is provided to disable PUMP_EN during reset mode to prevent the PUMP_EN signal from turning on charge pump 110. For example, the terminal of comparator 220 connected to VREF as shown in FIG. 2 might be modified to incorporate a switch that is controlled to ground the terminal during reset mode to prevent assertion of PUMP_EN.

During sampling mode, RESET and SAMP_EN are de-asserted thereby cutting off reset transistors 231 through 233 and turning on switch transistor 206 and biasing transistor 234. Activation of biasing transistor 234 connects biasing node 236 to VREF while deactivation of first reset transistor 231 creates a high impedance path between biasing node 235 and sampling node 203. Deactivation of second reset transistor 232 creates a high impedance path between biasing node 236 and ground. De-assertion of SAMP_EN enables sampling by coupling capacitor divider 210 to VPP and causing first and second capacitors 201 and 202 to charge up to values determined by the magnitude of VPP and the sizes of capacitors 201 and 202 according to EQ. 1 above.

While VPP can and will vary with time, the divided down ratio of VPP reflected at sampling node 203 will generally remain fairly close to VREF while the charge pump is at its targeted value. Because biasing node 235 was precharged to VREF during reset mode, the voltage across the source/drain terminals of first reset transistor 231 will generally be very close to zero during sampling mode thereby desirably reducing subthreshold leakage current through first reset transistor 231 and sample drift at sampling node 203. In other embodiments (not depicted), first reset transistor 231 as well as other transistors may be bipolar transistors, in which case the current terminals of transistor 231 would be the collector and emitter terminals.

Although the invention is described herein with reference to specific embodiments, various modifications and changes can be made without departing from the scope of the present invention as set forth in the claims below. For example, although the described embodiments illustrate the charge pump voltage regulator as being implemented in a flash memory device, the charge pump may be implemented in other types of integrated circuits that employ a regulated charge pump. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A voltage regulator operable in a reset mode and a sampling mode, the voltage regulator comprising:

a capacitor divider operable in the sampling mode to generate, at a sampling node, a sample voltage (VSAMPLE)

from a voltage to be regulated (VPP) wherein VSAMPLE is indicative of VPP;
a reset circuit including a first reset transistor connected to the sampling node and operable to:
discharge a first capacitor of the capacitor divider through the first reset transistor in the reset mode; and
bias, in the sampling mode, the first reset transistor wherein a voltage across current terminals of the first reset transistor is approximately 0 V; and
a comparison circuit operable in the sampling mode to compare VSAMPLE to a reference voltage VREF and generate an enable signal based thereon.

2. The voltage regulator of claim 1, wherein a control terminal of the first reset transistor is configured to receive a reset signal (RESET) that is asserted during the reset mode, wherein the first transistor conducts during the reset mode and does not conduct during the sampling mode.

3. The voltage regulator of claim 1, wherein a first current terminal of the first reset transistor is connected to the sampling node and a second current terminal of the first reset transistor is connected to a biasing node.

4. The voltage regulator of claim 3, further comprising a second reset transistor having a first current terminal connected to the biasing node and a second current terminal connected to ground, wherein a control terminal of the second reset transistor is configured to receive the reset signal RESET, wherein the second reset transistor is conductive during the reset mode and is not conductive during the sampling mode.

5. The voltage regulator of claim 4, wherein the capacitor divider includes the first capacitor connected between ground and the sampling node and a second capacitor connected between the sampling node and an upper node.

6. The voltage regulator of claim 5, further comprising a switch transistor having current terminals connected between the upper node and VPP wherein the switch transistor is operable to be conductive during the sampling mode and to be not conductive during the reset mode.

7. The voltage regulator of claim 1, further comprising a third reset transistor having a first current terminal connected to the upper node and a second current terminal connected to ground, wherein a control electrode of the third reset transistor is configured to receive the reset signal RESET, wherein the third reset transistor is ON during the reset mode and OFF during the sampling mode.

8. The voltage regulator of claim 7, wherein the first, second, and third reset transistors and the biasing transistor are NMOS transistors and the switch transistor is an PMOS transistor.

9. The voltage regulator of claim 3, wherein the reset circuit is operable to bias the biasing node to VREF during the sampling mode.

10. The voltage regulator of claim 9, further comprising a biasing transistor having current terminals connected between the biasing node and VREF, wherein a control electrode of the biasing transistor is configured to receive an inverted RESET signal wherein the biasing transistor is OFF during reset mode and ON during sampling mode.

11. A circuit, comprising:
a charge pump operable to receive a supply voltage (VCC) and produce a programming voltage (VPP) that is different than VCC; and
a voltage regulator configured to receive VPP as a first input signal and a reference voltage (VREF) as a second input signal and operable to generate, during a sampling mode, an enable signal based on VPP and VREF, wherein the enable signal activates the charge pump;

wherein the voltage regulator is operable in the sampling mode and in a reset mode and includes:
a capacitive circuit including a first capacitor, wherein the capacitive circuit is operable in the sampling mode to produce a sample voltage (VSAMPLE) at a sampling node wherein VSAMPLE is indicative of VPP;
a comparator to compare VSAMPLE to VREF to produce the enable signal; and
a first reset transistor connected between the sampling node and a biasing node; and
wherein the voltage regulator is operable to:
discharge, through the first transistor, the first capacitor during the reset mode; and
turn off the first transistor and bias the biasing node to VREF during the sampling mode.

12. The circuit of claim 11, wherein the first reset transistor, the first capacitor, a second capacitor of the capacitor divider, and a first input of the comparator are each connected to the sampling node.

13. The circuit of claim 11, wherein the capacitive circuit includes the first capacitor connected between ground and the sampling node and a second capacitor connected between the sampling node and an upper node and further wherein the voltage regulator is further operable to discharge the second capacitor in the reset mode wherein the sampling node and the upper node are reset to a known level prior to termination of the sampling mode.

14. The circuit of claim 11, further comprising:
a second reset transistor having current terminals connected between ground and the biasing node; and
a biasing transistor having current terminals connected between VREF and the biasing node;
wherein the first and second reset transistor are operable to be conductive during the reset mode and not conductive during the sampling mode and the biasing transistor is operable to be non conductive during the reset mode and conductive during the sampling mode.

15. The circuit of claim 14, further comprising:
a switch transistor connected between VPP and the upper node; and
a third reset transistor connected between the upper node and ground;
wherein the switch transistor is operable to be not conductive during the reset mode and conductive during the sampling mode and the third reset transistor is operable to be conductive during the reset mode and non conductive during the sampling mode.

16. The circuit of claim 11, wherein the first reset transistor is an NMOS transistor.

17. A voltage regulator operable in sampling mode and a reset mode, the voltage regulator comprising a capacitor divider operable to produce from an input voltage (VPP) a divided down voltage at a sampling node during the sampling mode, wherein a primary leakage path from the sampling node comprises a first reset transistor having its current terminals connected between the sampling node and a biasing node, wherein the first reset transistor is operable to be OFF in the sampling mode and further wherein the biasing node is biased, in the sampling mode, to a reference voltage (VREF) that is approximately equal to the divided down voltage.

18. The voltage regulator of claim 17, further comprising a comparator configured to receive the divided down voltage as a first input, VREF as a second input and operable, in the sampling mode, to produce an enable signal indicative of the relative magnitudes of the divided down voltage and VREF.

19. The voltage regulator of claim 17, wherein the primary leakage path further comprises a second reset transistor having its current terminals connected between the biasing node and ground wherein the second reset transistor is operable to be ON during the reset mode and OFF during the sampling mode.

20. The voltage regulator of claim 17, further comprising a biasing transistor having its current terminals connected between the biasing node and VREF wherein the biasing transistor is operable to be OFF during the reset mode and ON during the sampling mode.

21. The voltage regulator of claim 17, wherein the capacitor divider includes a first capacitor connected between ground and the sampling node and a second capacitor connected between the sampling node and an upper node wherein the voltage regulator is configured to discharge the first and second capacitors in the reset mode.

22. The voltage regulator of claim 17, wherein the first reset transistor is an NMOS transistor.

* * * * *